Figure 1:
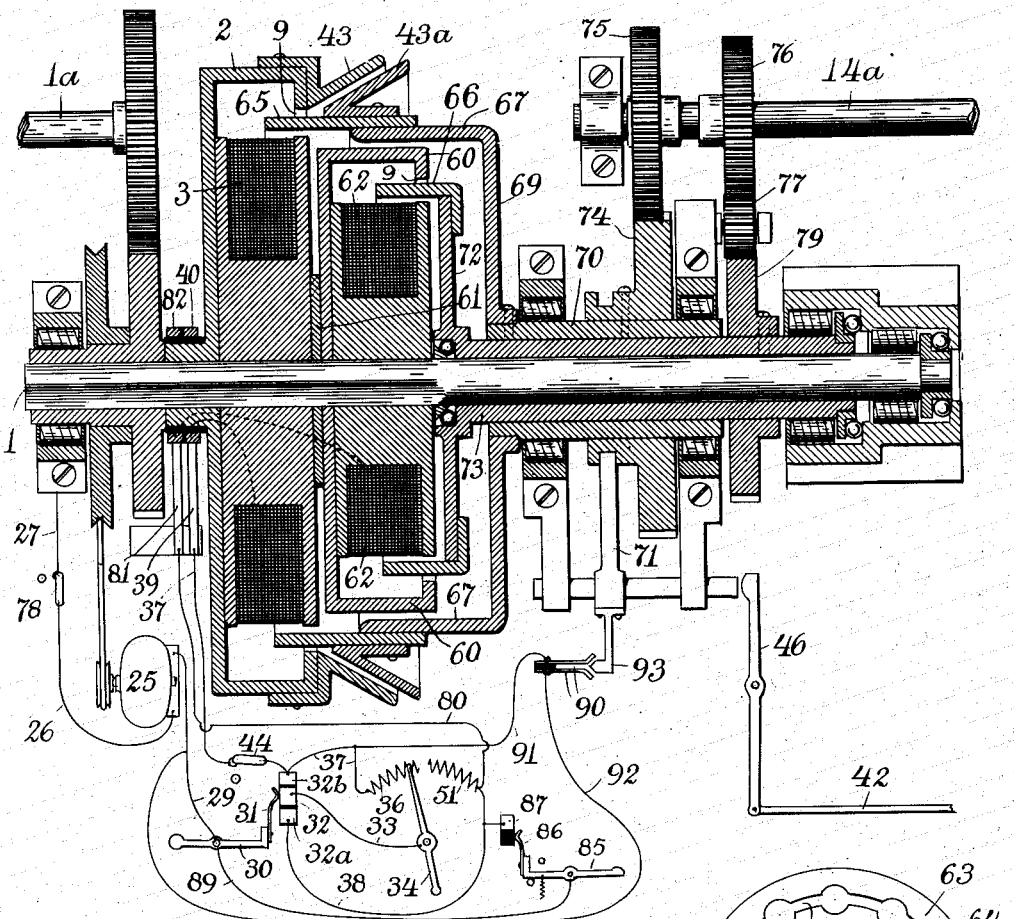

M. L. SEVERY.
POWER TRANSMITTING DEVICE.
APPLICATION FILED MAR. 26, 1912.

1,136,279.

Patented Apr. 20, 1915.
2 SHEETS—SHEET 1.

Witnesses;
E. M. Churchill
Albert F. Jones

Inventor,
Melvin L. Severy;
By A. B. Upham,
Attorney.

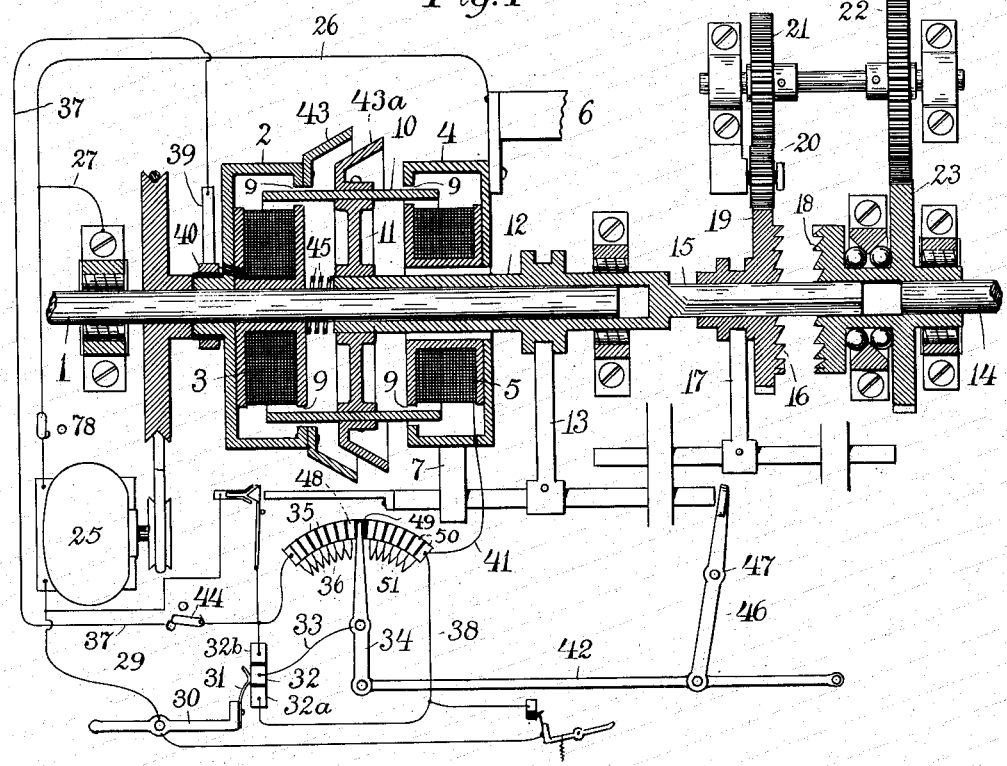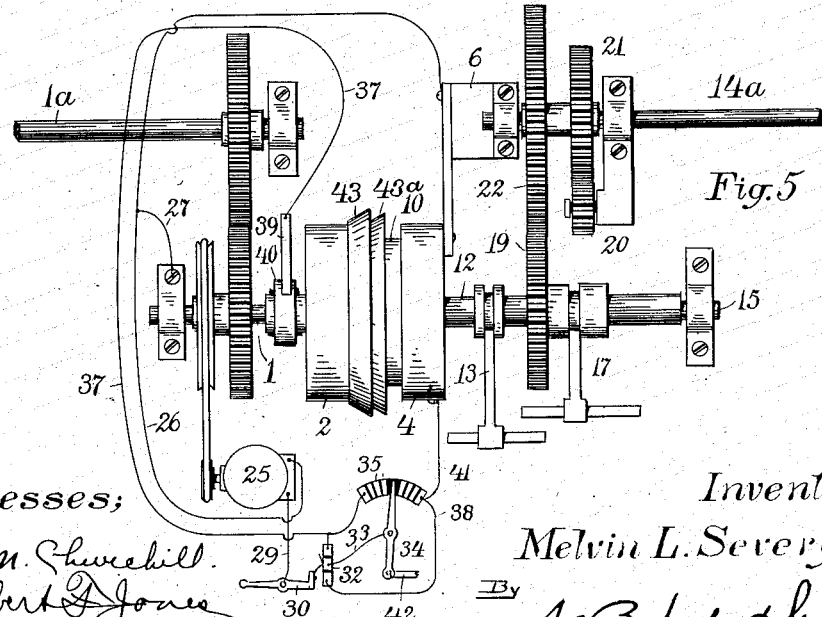

UNITED STATES PATENT OFFICE.

MELVIN L. SEVERY, OF ARLINGTON HEIGHTS, MASSACHUSETTS, ASSIGNOR TO SEVERY MANUFACTURING COMPANY, OF BOSTON, MASSACHUSETTS, A CORPORATION OF MASSACHUSETTS.

POWER-TRANSMITTING DEVICE.

1,136,279.　　　　Specification of Letters Patent.　　Patented Apr. 20, 1915.

Application filed March 26, 1912. Serial No. 686,371.

*To all whom it may concern:*

Be it known that I, MELVIN L. SEVERY, a citizen of the United States, and a resident of Arlington Heights, in the county of Middlesex and Commonwealth of Massachusetts, have invented certain new and useful Improvements in Power-Transmitting Devices, of which the following is a full and exact description.

The object of this invention is the construction of improved means for transmitting power from a driving means to a driven device, the improvements relating to means whereby electroinductive energy may be employed in a manner to permit the transmission of the whole or of a desired fractional part of the power.

The invention is particularly applicable to automobiles, power boats and other purposes wherein a comparatively invariable driving means is employed, such as an internal combustion engine, and where it is desired to vary the power taken therefrom to suit differing conditions of load.

In motor vehicles especially, it is of the utmost importance that the chauffeur shall have the most perfect and instant control of the speed of the car, and that he shall be able to make all necessary changes at any moment of emergency without being forced to wait for certain conditions precedent to such changes. As automobiles and the like are usually constructed, the transmission gearing provides for but three or four speeds, and these cannot be changed without due regard to the speed of the car at the time the change is attempted. In going from the lowest to the highest speed, for example, the gears for the intermediate speeds must first be put in mesh, and the change from any one speed to another is abrupt and accompanied by a jolt and a momentary slippage of the wheels, causing severe strain on the mechanism and great wear of the tires. Should the chauffeur, while going rapidly forward, suddenly find it necessary to reverse, he must perform a variety of acts to bring the car to a standstill, and another set of acts to cause it to run in the opposite direction at the desired speed. In such cases of emergency failure to perform these complicated functions properly, or the performance of them in the wrong order under the excitement of the moment, may result in disaster and loss of life.

It is the purpose of this invention to obviate these defects and to remove these limitations by providing means whereby a practically infinite number of speeds in either direction are always at the command of the operator, not by the laborious movement of a number of large levers for which he must reach, but by the mere pressure of a finger upon a single switch within reach without even removing the hand from the steering wheel.

A further object of the invention is to provide means whereby a single movement either of a finger or of a foot may instantly cut off the driving power and apply a braking power.

Still another object is to eliminate all jar ordinarily experienced in changing from one speed to another, thus saving wear and tear and enhancing pleasure and comfort.

A further object is to enable the operator, quite irrespective of the direction and speed of the car, instantly to set the mechanism controlling both said direction and speed by a single movement of a finger, without waiting a second for the car to pass through any speed increment or decrement. For example; while a car is moving sixty miles an hour in a forward direction, the chauffeur may instantly set the controlling mechanism so that, without a moment's further manipulation, the car will rapidly slow down, stop, reverse, and move rearwardly at, say, five miles per hour; or, if desired, the car may be made to come to a stop without reversing. In cases of emergency, such control is of inestimable value.

Another purpose of the invention is to provide means for overcoming certain vital limitations hitherto existing in inductive power-transmission mechanism of the class herein described. Such mechanism of necessity operates by virtue of a speed of the driving member of the inductive clutch in excess of that of the driven member, and, other things being constant, the power transmitted will be relatively great or little as this difference is great or little. Now this necessary "slippage" between the driving and driven members cuts down, in clutches of this type, either the speed or the efficiency,—and perhaps both,—of the driven member. In many instances it is extremely desirable, if not imperative, that the inductive power-transmission shall have a speed at the driven end as great as, or greater than, that of the engine. To provide a means for accomplishing this, while at the same time enhancing the efficiency of the transmission means, is one of the purposes of my invention.

As such transmission mechanism is ordinarily constructed, there is not only no way provided to bring the driven end of the clutch to the speed of the prime mover, but the inductive clutch is depended upon to do the work at all speeds, thereby consuming the power necessary to energize the clutch at all times when the mechanism is in motion. This is an important defect which it is one of the objects of my invention to remedy, and it is done by combining with the inductive power-transmission a friction clutch, or other suitable type of clutch, adapted to come into service at or beyond the maximum speed of the inductive mechanism; thus enabling the energizing current to be switched off, and the clutch members to drive forward substantially or entirely without slippage.

A similar system could be used for the rearward drive, were it necessary, but such would not ordinarily be the case as the speed of the inductive clutch would be far more than sufficient for progress in that direction. As this fixed-clutch drive is used at maximum speed, and as no power need then be used to energize the inductive clutch, the possession of such a clutch at no time puts a prejudicial tax upon the driving engine, since there is always a surplusage of power when it is used, and since its use eliminates friction representing probably many times the power taken to energize the clutch.

Another object of the invention is to provide a means for preventing the strain, jolt and wear of the fixed clutch when it is shut in, this being accomplished by having the inductive clutch carry its maximum load at just that instant.

A still further object of the invention is to provide braking means operating without jolt or wear, which means may be used by itself, or in combination with the usual devices for such purpose, and which when so used in combination, will greatly reduce the strain and wear of such usual devices.

A further purpose of the invention is to make the forward drive act as a brake on the rearward drive, and the rearward drive to act as a brake on the forward drive, whenever so desired, at the same time somewhat decreasing that gyroscopic tendency of the moving parts responsible for not a few accidents in automobiles.

Another object of the invention is to provide means whereby such use of either the forward-driving or the rearward-driving members of the clutch, when used as a brake, or for reversing, shall act with greatly increased power and rapidity due to the great inductive slippage resulting from the fact that the coacting clutch members are at the instant revolving in opposite directions.

Still another prime object of my invention is the doing away with the necessity for shifting gears whether in changing from one forward drive to reverse, or in changing the speed of either drive, thus enhancing the comfort, minimizing wear, and greatly increasing safety by reason of the exceeding tractability of the mechanism.

Another object of the invention is to simplify construction and to render the control of the car much easier of acquirement and far less liable to be improperly administered under the excitement and stress of an emergency.

A still further object is to secure maximum economy of fuel by providing means permitting the car to be run at any desirable speed without changing the engine from its speed and condition of maximum efficiency.

A further object of the invention is to enable the engine to deliver its full power to the car at a car-speed so low that grades may be climbed which at ordinary "slow-speeds" of cars as at present constructed would "stall" the engine.

Another object of the invention is to make it possible, where desired, to do away with the awkward side hand levers of the present automobile, running the car entirely from the steering wheel and foot-levers.

An added purpose accomplished is that of doing away with the heavy fly-wheel ordinarily found necessary, and having the clutch members perform all the work thereof.

Figure 2:
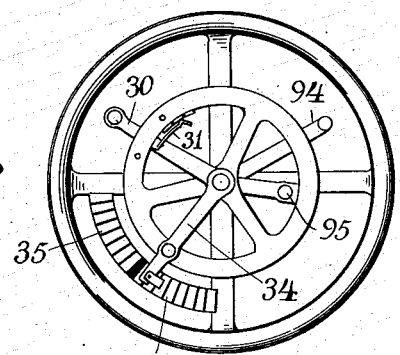
Figure 3:
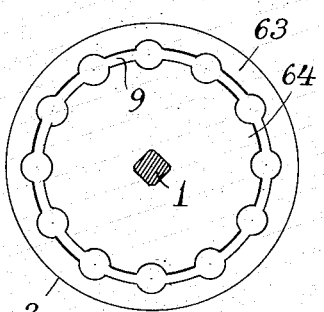

In the drawings forming part of this specification, Figure 1 is a sectional plan view of a power transmission and braking device made in accordance with my invention. Fig. 2 is a plan view of a portion of the steering mechanism forming part of the invention. Fig. 3 is a detail view of a part of the inductive clutch used therein. Fig. 4 is a sectional plan view of a modification of the invention. Fig. 5 is a plan view of a further modification thereof.

Referring to Fig. 4, the reference numeral 1 designates a shaft to which power is imparted from a source at its left hand extremity, supposedly an internal combustion engine, such shaft being therefore termed the driving member. Fixed upon this shaft to rotate therewith is a drum 2 containing a spool having windings 3 adapted when electrically energized to cause magnetic lines of force to stream across the annular slot 9.

A similar drum 4 and windings 5 are located concentric with said shaft but supported upon fixed frame members 6, 7 so that it cannot turn. Each drum is formed with annular slots 9 in which is freely movable an annulus 10, preferably of copper, suitably mounted upon a disk or wheel 11.

carried by a sleeve 12 loosely movable on said shaft 1. By sliding said sleeve toward the drum 2, the friction members 43, 43ª are brought into coaction, said sleeve being moved by a suitable shifting arm 13.

The rotary motion of said sleeve is communicated to the driven shaft 14, which is suitably connected with the driving wheels of an automobile, or to whatever other mechanism for which the power transmission is designed, by means of a shaft-extension 15 upon which is slidably mounted a clutch member 16 controlled by a shifting arm 17. Rigid with the shaft 14 is a coöperating clutch member 18, whereby said sleeve and shaft 14 are made to revolve together. By sliding the clutch member 16 away from its coöperating member until the spur gear 19 intermeshes with the idler gear 20, a reverse motion is communicated to the shaft 14 through said idler and gears 21, 22 and 23; but by sliding said member 16 to a point midway of its two extremes of movement, said sleeve and shaft are made independent of each other and no power is communicated to the driving wheels or other mechanism.

Current is supplied for energizing the windings 3 and 5 by means of an electric generator 25 rotated by power belted from the driving shaft 1; or this generator may be dispensed with and a battery or other source of current used. In either case, one end of the windings of each spool is put in circuit with the framework of the mechanism, which in turn is connected with the generator by leads 26, 27. The other pole of the generator is connected by a wire 29 to the emergency lever 30 which carries a brush 31 movable into touch with either of the three contacts 32, 32ª, 32ᵇ.

The intermediate contact 32 is joined by a wire 33 to the lever arm 34 carrying a brush arranged to sweep the contacts 35 of a variable resistance 36, and the contacts 50 of a resistance 51. From one end of said resistance a wire 37 connects with a brush 39 in touch with the insulated collar 40 which is joined with the terminal of the windings 3 not in circuit with the framework.

With the emergency lever 30 in its illustrated position, and the lever arm 34 moved so as to be in touch with the contact 48 of the rheostat 35, the current from the generator flows through the wire 29, lever 30, brush 31, intermediate contact 32, wire 33, lever arm 34, resistance 36, wire 37, brush 39, collar 40, windings 3, framework, and wire 26, 27, back to the other pole of the generator. By varying the position of the lever arm 34 between the insulated section 49 and the left end of the rheostat, in order to cut in or out different degrees of resistance, the current delivered to said windings will be correspondingly varied, and the inductive grip on the annulus 10 will be similarly affected.

For energizing the windings 5, the current from the generator 25 traverses the wire 29, lever 30, brush 31, intermediate contact 32, wire 33, lever arm 34,—the latter having been moved into touch with the right hand contacts 50,—resistance 51, thence by the wire 41 to one terminal of the windings 5, and then through the latter and the framework and via the wires 26 and 27 back to the generator. By this arrangement, when the rod 42 is progressively forced toward the right, and the annulus 10 caused thereby to enter farther into the drum 2, the lever arm 34 is made to move toward the left hand contacts 35 and so to cut out resistance in the circuit of the windings 3, until the driving action of these rotating windings 3 is imparting its maximum propulsive moment to the associated annulus. When this last degree is reached, the conical clutching surfaces 43, 43ª are pressed into sufficient engagement to enable the driving of the driven members to be performed entirely thereby.

If desired, a switch 44 in the circuit of the windings 3 may be turned to cut out the current thereto, so that the power transmission will be performed by the friction clutch entirely; or a switch 78 in the feed line 26 may be used to cut all the current out of both windings.

In case it is desired suddenly to stop the automobile, as in some emergency, the lever 30 is thrown to present its brush 31 to the lowermost contact 32ª, when the current will be made to traverse the wires 38, 41, and all resistance will be cut out from the stationary windings and their full braking power will be brought into effect. By shifting the emergency lever 30 to present its brush to the topmost contact 32ᵇ, full current will be switched to the driving windings 3, and thus the maximum inductive force will be exerted upon the associated annulus.

In the construction shown in Fig. 5, substantially the only difference over that above described is that of the arrangement of the variable power transmission device on a countershaft geared to the engine shaft 1ª and to the shaft 14ª connected with the driving wheels of the automobile. Here there need be no clutch members 16, 18 (Fig. 4), since the gear 19 can be shifted out of its mesh with the gear 22, or into mesh with the idler 20; this latter being adapted to give a reverse motion to the shaft 14ª. I prefer in this construction to speed up from the shaft 1ª to the shaft 1, and to speed down again via the gears 19, 22. As shown, the shaft 14ª will be driven by the inductive means at a speed somewhat below that of the shaft 1ª, but any desired speed may be attained by suitably arranging the sizes of the gears.

I prefer to locate a coiled spring 45 between the drum 2 and the sleeve 12 in order that a simple movement of the chauffeur's foot releasing the power treadle will effect the shutting off of the power and disengaging of the friction members 43, 43ª, and will at the same time apply the inductive braking action, provided the rod 42 is permitted to swing a sufficient distance to the left. If no braking action is desired when the power is thus diminished or cut off, the rod 42 is restrained from its full movement so that the contacting lever 34 is not permitted to pass the insulated section 49. When the automobile is to be brought gradually to a stop from its highest speed, the chauffeur slowly releases the rod 42, which has by means of the lever 46 intermediately pivoted at 47 been holding the clutch members 43, 43ª in engagement, and gradually reduces the degree of driving energy in the coil or windings 3 to zero, and then gradually increases the braking action of the coil or windings 5 to maximum. All this may with perfect propriety, however, be done instantly.

For convenience of illustration, the emergency switch 30 and variable resistance lever 34 are shown as if close to the clutch 43, 43ª, though this would not ordinarily be so in practice. When used in an automobile or the like, both of these devices would preferably be close to the hand or foot of the chauffeur, an excellent location for them being at the steering wheel, though either or both may be arranged for foot control. Fig. 2 shows said devices arranged upon the steering wheel, as more fully described later.

In order to do away with all jolts and jars of gear changing, and mechanical clutching, I have still further improved my invention, arranging and constructing it so that not only are speed changes performed electrically, but reversals in direction as well. Such a form of the invention is illustrated in Fig. 1, where the reference numeral 1 designates the transmission shaft; 1ª, the shaft receiving power from the engine and suitably geared to the shaft 1; 2, the drum containing the coil or windings 3 the same as the like-numbered parts previously described; and 25, the generator belted to said shaft 1.

Fixed upon the shaft 1, which is preferably squared for such purpose, is another inductive clutch drum 60 similar to the inductive clutch drum 2, but smaller in diameter; said drums being separated magnetically by a thin non-magnetic disk 61. This drum 60 is also provided with a spool and windings or coils 62, adapted when energized to create a strong magnetic field in the annular spaces 9 (Figs. 1 and 3), the magnetic flux streaming between the parts 63 and 64 of each drum. (Fig. 3.)

Rotatably movable in said annular spaces 9 and adapted to cut the lines of force streaming across the same, are the annuli 65 and 66, preferably of copper, the larger and outermost one (65) being surrounded by a rigidly attached conical clutch member 43ª adapted to coact frictionally with the internally conical clutch member 43, forming part of, or rigidly attached to, the larger drum 2, said members being adapted for such coaction when said annulus is pressed farther within the drum 2. Said annulus is thus moved by being carried upon the flange 67 of the wheel 69 fixed on a sleeve 70 longitudinally adjusted by a suitable shifting lever 71. The annulus 66 rotatable in the space 9 of the drum 60, is supported by a disk 72 rigid with a sleeve 73 rotatable upon said shaft 1 and within said sleeve 70. Said annuli 65, 66 are made rotatable in opposite directions by means of the spur gear 74 fixed on the sleeve 70, the gear 75 meshing therewith and fixed on the driven shaft 14ª, the gear 76 fixed on said shaft, the idler gear 77 meshing with the gear 76, and the gear 79 meshing with said idler and fixed on the sleeve 73. If now the coil 3 is energized and the annulus 65 is consequently made to rotate therewith, the shaft 14ª will be turned in a direction opposite to that of the shaft 1; but if said coil 3 is demagnetized and the coil 62 energized, then the annulus 66 rotated by the latter will cause the shaft 14ª to turn in the same direction as does the shaft 1. Consequently all that needs to be done in order to reverse the car provided with this power transmission, is to throw a little switch controlling the current to said coils.

The electric connections for the coil 3 is substantially the same as that described in connection with the first form of my transmission device, the current passing from the generator 25 or other current-source, through the wire 26, switch 78, wire 27, framework and shafting to one terminal of said coil, and thence from the other terminal to the insulated collar 40, brush 39, wire 37, switch 44 in the last-named wire, resistance 36, lever 34, wire 33, contact 32, brush 31, switch lever 30 and wire 29 back to the generator. By varying the position of the rheostat arm or lever 34, the strength of the magnetic flux of said coil 3 is correspondingly varied, and also the torque exerted thereby upon the annulus 65. As the torque increases or diminishes, the slippage between the coil and annulus varies accordingly, and hence the less the magnetic flux of said coil, the slower the speed communicated to the driven member. If, now, the current is cut out from the coil 3 and cut into the coil 62, correspondingly variable reverse motion is thereby transmitted to the driven member of shaft 14ª; the switching means for such purpose comprising the lever 34, and the circuit for thus energizing the coil 62 consisting of the wire 29 from the generator 25, switch or emergency lever 30, brush 31, contact 32, wire 33, lever 34, resistance 51, wire 80, brush 81, collar 82, and one terminal of the coil 62; thence through the latter and the framework grounded therewith, wire 27, switch 78 and the wire 26 back to said generator.

The emergency switch 30 for throwing on either full speed ahead or full speed astern, operates the same as in the construction first described. In addition to this switch, I prefer to provide a foot lever 85 adapted for switching into the coil 62 a full current, no matter what the conditions or current may be at the moment in either coil. When said foot lever is moved to present its brush 86 into touch with the contact 87, the current flows directly through the wires 29, 89 to said lever, and thence through said brush and contact and suitable connections to the wire 80, and brush 81 to the coil 62. The advantage of this foot lever 85 is that it enables the reverse inductive clutch instantly and fully to be thrown into action, and the automobile brought to a stop at a moment when the chauffeur's hands may both be busy, and even though all or any part of the resistance may be in the circuit, or though the switch 44 may be open. This emergency lever 85 is provided with a spring for returning it instantly to normal as soon as it is released.

To insure that when, through the operation of the rod 42, lever 46 and shifting arm 71, the clutch members 43, 43ª are put into engagement, there may be current in the coils 3 so that the clutch members will not act alone and consequently slip and grind, I provide a pair of contacts 90 normally insulated from each other and put by means of wires 91, 92 into the circuit of said coils. A finger 93 carried by said arm 71 is brought into touch with said contacts 90 just before the clutch members meet, and so completes the circuit to said coils. As soon as the clutch is fully engaged, the current may be cut out from the coils 3, preferably by opening the switch 44, or the switch 78, and the car run at full speed through the contactual clutch transmission 43, 43ª alone. The two levers 94 and 95 shown in Fig. 2 represent the usual throttles and spark control.

By having a large number of contacts 35 (Fig. 4) for the resistance 36, an equal number of different speeds forward is provided; but in case a finer gradation still must be had, as in a procession which is moving slightly slower than one speed and slightly faster than the next slower one, it is only necessary for the chauffeur to shift the switch lever 34 back and forth between the two contacts controlling the adjacent degrees of resistance and thereby securing an average of speed equal to that of the other vehicles of the procession.

This power transmission device, therefore, gives all speeds. It is without jolts and jars. It obviates jerkiness in travel, thus saving tires and increasing comfort. It has practically no wearing surfaces. It enables the engine to work at its most economical speed, with any desired car-speed. It is economical to use, since the current employed is probably less than the power consumed by the usual gears; at all events, such power is negligible, for the clutch only requires power when the friction clutch is out, and that means that it only needs power when the engine has power to spare, that is, when it is not driving at top speed. It provides superior emergency conditions, inasmuch as a mere movement of the chauffeur's finger cuts out the current and applies a braking action; and in other ways this variable power transmission secures the advantages set forth herein before.

What I claim as my invention and for which I desire Letters Patent is as follows, to wit:—

1. The combination with a driving means and a driven mechanism, of inductive clutching means for transmitting forward motion from the driving means to the driven mechanism, inductive clutching means for transmitting rearward motion from the driving means to the driven mechanism and electrically actuated means operative at will whereby while either of said forward propelling or rearward propelling clutching means remains in operation, the other clutching means may be made to brake the action of said operating clutching means.

2. The combination with a driving means and driven mechanism, of inductive clutching means for transmitting forward motion from the driving means to the driven mechanism, inductive clutching means for transmitting rearward motion from the driving means to the driven mechanism, and means operative at will whereby when either the forward-propelling clutching means, or the rearward-propelling clutching means is in operation, the other clutching means may be made to brake the action of said operating clutching means, said clutching means being so interrelated that the speed imparted by the driving action of one intensifies the braking action of the other.

3. The combination with a driving means and a driven mechanism, of clutching means for transmitting power from the driving means to the driven mechanism, a portion of said clutching means acting inductively and another portion acting contactually, means for varying the power of said inductive portion of the clutching means, means for rendering operative the contactual portion of said clutching means, and means whereby said inductive clutching power is at its maximum when said contactual portion of the clutching means becomes operative.

4. The combination with a driving means and a driven mechanism, of two inductive clutches operatively connected with the same, a source of current and circuits for said clutches, a rheostat in the circuit of each clutch, and a single contact member common to both circuits and adapted to sweep over both rheostats successively, the latter being insulated from each other.

5. The combination with a driving means and a driven mechanism, of two inductive clutches operatively connected with the same, a source of current and circuits for said clutches, a rheostat in the circuit of each clutch, and a single contact member common to both circuits and adapted to sweep over both rheostats successively, said rheostats being insulated from each other, the circuit-connection of each rheostat being at its outermost end.

6. The combination with a driving means and a driven mechanism, of a mechanical clutch member carried by the driving means, a coöperating clutch member carried by the driven mechanism, an inductive clutch member carried by the driving means, an annulus carried by the driven mechanism in the field of said inductive clutch member, said coöperating clutch member being rigid with said annulus, and means for moving said annulus axially at will and thereby putting said mechanical clutch members into engagement.

7. The combination with a driving means and a driven mechanism, of two variable clutches between said means and mechanism, one of said clutches being adapted for delivering a reverse direction of motion, and a single movable controller for both clutches, said controller being adapted to deliver maximum power at each extreme position, and to diminish such power as it is moved toward an intermediate position.

8. The combination with a driving means and a driven mechanism, of two inductive clutches between said means and mechanism, one of said clutches being adapted for delivering a reverse direction of rotation, and a controller adapted, by a single movement, to switch energizing current of any predetermined range of power to either clutch, whereby one inductive clutch may act as a brake to the energy previously delivered through the other clutch.

9. The combination with a driving means and a driven mechanism, of an inductive clutch comprising two members one of which is turned by the driving means and the other of which turns with the driven mechanism, said members having limited relative axial play, two coacting friction clutch members connected with the respective members of said clutch, means controlled at will for relatively shifting the latter members and putting the friction clutch members into engagement, and means for energizing the inductive clutch adapted to be put into operation by said controlled means immediately prior to the engagement of said friction clutch members.

10. The combination with a driving means and a driven mechanism, of two inductive clutches each comprising a magnetically attractive drum having an annular slot in a flat face, and a coil within the drum adapted to make the edges of said slot of opposite polarity, one drum being of smaller diameter than the other, an annulus rotative freely in each slot, a shaft supporting and turning with said drums, a sleeve rotative on said shaft and carrying the smaller annulus, a sleeve rotative on the first-named sleeve and carrying the larger annulus, means forcing said sleeves to rotate in opposite directions, and means controlled at will for energizing said coils.

11. The combination with a driving means and a driven mechanism, of two inductive clutches for transmitting power from the driving means to the driven mechanism, one clutch being adapted to deliver a reverse motion, a current source and rheostats adapted for the energization of said clutches and having a common controlling lever and suitable circuits, and an emergency switch connected with said circuits and adapted by a slight movement to cut out said rheostats from the circuits of either inductive clutch.

In testimony that I claim the foregoing invention, I have hereunto set my hand this 23rd day of March, 1912.

MELVIN L. SEVERY.

Witnesses:
A. B. UPHAM,
ALEXANDER I. PECKHAM.